Patented Dec. 25, 1923.

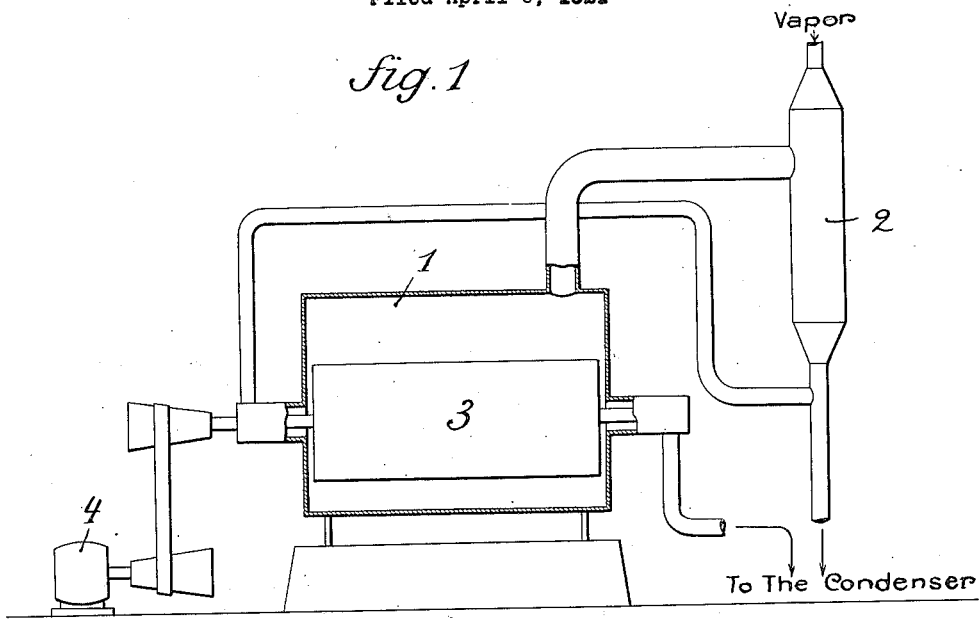
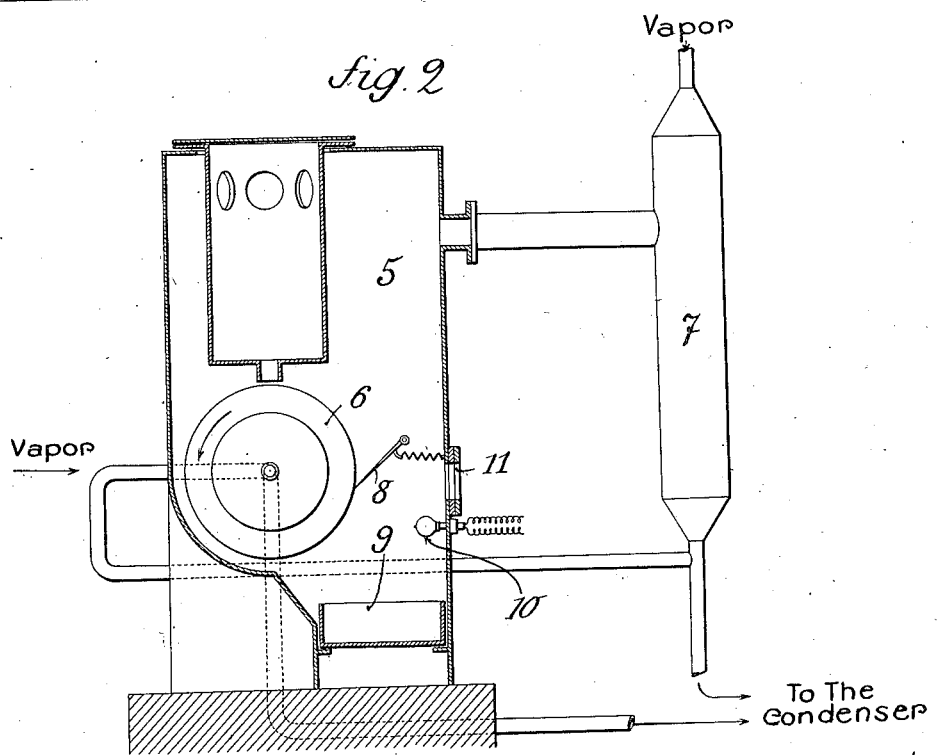

1,478,940

UNITED STATES PATENT OFFICE.

ADOLPHE CHALAS, OF NEUILLY, FRANCE.

PROCESS OF PREPARING OF DRY AND SOLUBLE EXTRACT OF ROASTED COFFEE.

Application filed April 6, 1921. Serial No. 459,097.

*To all whom it may concern:*

Be it known that I, ADOLPHE CHALAS, a citizen of the Republic of France, and residing in Neuilly, Seine Department, No. 14 Rue Angelique Verien, in the Republic of France, engineer, have invented certain new and useful Processes of Preparing of Dry and Soluble Extract of Roasted Coffee, of which the following is a specification.

My invention relates to the preparation of a dry and complete extract of coffee which contains without alteration or appreciable loss the total amount of the soluble principles of the coffee or those which are developed by the action of roasting.

According to this invention, the infusion or decoction of roasted coffee, which may be prepared under the usual conditions and by the known methods, is filtered, cooled, and then evaporated in a very high vacuum of the order of a few millimeters of mercury corresponding, for the vapor of water, to boiling temperatures of say —10° C. up to 0° C., freezing being however avoided by an abundant adduction of heat which causes an energetic evaporation to take place whilst the temperature is kept around that of melting ice or slightly above (say +2° C.).

Evaporation can of course be conducted at higher temperatures, but an alteration of the extract soon incurs, as it gradually looses the best of its aromatic substance.

Under the above stated conditions, no appreciable loss or alteration of the dissolved products is occasioned, and the most subtle aromatic principles are retained in the brown-colored mass of the dry extract which will be hereafter described.

The necessary vacuum may be produced by the use of pumps of the piston or rotary type, by nozzles or by steam ejectors. It is advantageous to employ two ejectors operating in series, with a condenser of the injection type interposed between the same. The evaporation may be effected either in a single operation in a vacuum chamber, or in two operations whereof one is used for concentration and the other for desiccation, or in a plurality of successive operations.

The evaporation in a closed chamber is preferably carried out in very thin layers which are retained by capillarity upon surfaces revoluble in a vertical plane, such as disks, cylinders and the like, which are immersed at the lower part thereof in the infusion to be evaporated and are caused to emerge therefrom moistened by the said infusion.

The evaporation in vacuo is effected in an energetic manner immediately after the emersion, and the heat absorbed by this evaporation is constantly renewed by the adduction of heat by means of a luke-warm steam or water circulation in contact with the surfaces of evaporation.

If for instance a revoluble hollow drum is employed, the same is mounted upon hollow journals used for the introduction of the heating agent. Should the evaporation be effected in a single operation, the speed of rotation is regulated according to the rate of evaporation whereby the desiccation of the extract shall be completed at the moment when the rotating portions encounter the scrapers disposed for the removal of the solid product and the discharge thereof into a distinct receptacle, and the surfaces thus cleared of extract are again immersed in the liquid, and so forth.

The extract of coffee thus obtained has the appearance of a mass which is in the state of pulverulent flakes after the scraping process, but is still somewhat moist and agglomerated.

The desiccation is to be completed in the air or in vacuo in presence of hygroscopic substances.

Desiccation in the air is effected in drying chambers of the closed type and provided with suitable circulation the air being sent through a refrigerating device for removing the moisture therefrom and for suitably drying the same before it is again caused to pass in contact with the extract of coffee which is thereby desiccated in a rapid manner.

The desiccation in vacuo is carried out in the presence of concentrated sulphuric acid, chloride of zinc or calcium, anhydrous sulphate of copper, or like hygroscopic substance.

It is found preferable, for the purpose of increasing the output of the evaporating and desiccating apparatus, to remove the extract from the evaporation surfaces much before it comes to the solid consistency which enables it to be removed in the state of pulverulent flakes by the scraping action.

It should in fact be observed that the extract passes through several degrees of hydrated consistency during the process of desiccation.

As evaporation proceeds, the infusion of coffee arrives to a point when it reaches rather quickly a state of concentration wherein it becomes sufficiently thick to cease to flow. When this semi-liquid extract, which subsequently reaches the viscous state within a short time, contains no more than say one-third its weight of water, it is still readily removed from the metal surface whereto it adheres, the said surface being left in a clean and bright state after the scraping action. It is in this state that it is found preferable to collect the product.

After this moment, and as the desiccation progresses, the extract becomes continually more viscous and tenacious, and the scrapers are able to remove the same only in a very incomplete manner, and the balance will remain strongly adhering to the evaporating surface.

It is only at a subsequent period that when almost completely dry the extract can be finally removed in the state of brittle flakes.

The soft extract which still contains about one-third of its weight of water, is therefore the product which it is desired to obtain in this operation, and it should be observed that when in this state, the product retains the aromatic principles in a very complete manner, thereby rendering it possible to fignish the desiccation of the same not only in vacuo, which is always preferable, but likewise in air, provided the operation is carried out at about the ordinary temperature, or rather at a lower degree.

As soon as the desiccation is commenced under these conditions, there is formed on the surface of the moist extract a sort of blackish film of a dry and lustrous character which hinders and delays the evaporation of the subjacent water.

A convenient method for obviating this drawback consists in cooling the said extract down to the freezing point of water or even below, as this can be effected without any inconvenience.

In this state, the product is of a dry and brittle nature and may then be crushed or ground in order to rapidly complete the drying process thus applied on minute fragments.

The dry extract, which is entirely soluble in water, is of an indefinite preservation, without addition of any conservative substance.

When dissolved in the corresponsive amount of water (viz in the proportion of about 2.5 to 3% for the preparation of strong black coffee) the dry extract restores all of its aroma, taste, and flavor, to the infusion thus readily obtained.

The drawings show an apparatus for carrying out the process.

Fig. 1 is an elevation partly in section of the evaporating device.

Fig. 2 is an elevation partly in section of the drying device.

The infusion to be concentrated is placed in an evaporating device 1 of aluminium wherein a vacuum is produced and maintained by a refrigerating ejector 2 using dry saturated steam. The infusion which is kept at a point near $+2°$ C. is heated by vapor which is discharged from the refrigerating ejector 2 and is circulated within a movable heating cylinder 3 of aluminium which rotates in the stationary evaporating device. The heating cylinder is driven by an electric motor 4.

The concentrated infusion is then placed in the upper part of a drying device 5 and is made to flow over the peripheral surface of a movable cylinder 6 rotating within the fixed drying device. The vacuum is maintained in the drying device by a refrigerating ejector 7 using dry saturated steam; the concentrated extract is heated near $+2°$ by the steam discharged from the refrigerating ejector and circulating in a movable heating cylinder 6.

The nearly dry extract obtained from the desiccation is removed from the heating cylinder 6 by a scraper 8 of suitable kind, and it drops into a receptacle 9 situated at the lower part of the drying device. The heating cylinder is driven by an electric motor, not shown. The operation within the apparatus can be followed by the use of an electric lamp 10 and a sight hole 11.

The extract discharged from the drying device is then placed in a drying chamber, not shown, wherein it is completely dried; the vacuum is maintained in said drying chamber by a refrigerating ejector using dry saturated steam. The product which is maintained near $+5°$ C. is heated by the steam from the refrigerating ejector which circulates within plates whereupon is disposed the said product.

The steam from the three refrigerating ejectors is condensed by a jet condenser, not shown.

The above described process of evaporation is not limited to a particular mode of execution, and evaporating methods by expanding or sprinkling into a rain or spraying the liquid in the vacuum may also be employed, especially when the evaporation is effected in two operations as above stated, in which case the first infusion or decoction is expanded in the concentrating-chamber, in which about 80% of the water is eliminated. The concentrated liquid is then discharged onto the revoluble evaporation surfaces in the desiccating-chamber, wherefrom the moist extract is collected as previously described. In such a case, the liquid in the concentrating-chamber is kept into circulation between the concentrator and a reheating apparatus in which it recovers enough heat as to avoid freezing when it flows back into a rain in the concentrator.

So as to assure a quicker solubility of the dry extract in water, the best is to mix it with about its own weight of dry sugar, both ingredients being powdered either separately or together for mixture.

In the cases where saccharose is not desired, either because of its sweet taste, or on account of dietetic purposes, it can be conveniently replaced by lactose.

In any way, the product is stirred up at first with a small quantity of water which dissolves it almost instantly, and then added with the necessary amount of water to complete as desired.

The dissolution is practically as rapid in cold as in boiling hot water.

For the making of coffee with milk or cream, water is replaced by the same in this preparation.

Besides sugar, lactose, etc., the dry extract can be mixed with other dry and soluble alimentary products, such as dry milk powder, to be used for the preparation of coffee with milk by simple addition of hot water.

The extract can of course be utilized, if desired, in any of its successive stages of preparation.

For instance, the concentrated infusion as it comes out of the cencentrating-chamber makes a good essence of coffee to be preserved and used in the liquid state.

In the same way, the soft extract as it comes out of the desiccating chamber in vacuo, can also be used after a simple addition of water, milk, etc., and keeps satisfactorily if containing for instance a sufficient quantity of sugar.

Claims—

1. A process of preparation of dry and soluble extract of roasted coffee consisting in the preparation of an infusion or decoction of roasted coffee and in the evaporation thereof by the action of a very high vacuum at a temperature which is maintained near that of melting ice.

2. A process of preparation of dry and soluble extract of roasted coffee consisting in preparing an infusion or decoction of roasted coffee and in evaporating the same in a very high vacuum with accession of heat compensating for the cooling resulting from the rapid evaporation, the vacuum being exhausted and the heat being supplied in due proportion to maintain the temperature down to the necessary degree as to avoid any appreciable loss of aroma from the desiccated product.

3. A process of preparation of dry and soluble extract of roasted coffee consisting in preparing an infusion or decoction of roasted coffee, in expanding the said liquid in a very high vacuum with accession of heat compensating for the cooling resulting from the rapid evaporation, the vacuum being exhausted and the heat being supplied in due proportion to maintain the temperature down to or slightly above that of melting ice.

4. A process of preparation of dry and soluble extract of roasted coffee consisting in preparing an infusion or decoction of roasted coffee, in concentrating the said infusion by expanding the same in a very high vacuum with accession of heat compensating for the cooling resulting from the rapid evaporation and in further evaporating the concentrate expanded in a thin layer upon supporting surfaces having heat supplied thereto by suitable means as evaporation proceeds in a very high vacuum at a very low temperature, until the concentrate is brought to a soft state wherein it can still be scraped off easily from the supporting surfaces, and in desiccating completely the said soft extract.

5. A process of preparation of dry and soluble extract of roasted coffee consisting in making an infusion of coffee, in evaporating said infusion in a chamber wherein is maintained a low pressure in such manner that if the said pressure acted alone the said infusion would become congealed, and in heating the said infusion at the same time to the exactly sufficient degree to prevent its congelation.

In testimony, that I claim the foregoing as my invention I have signed my name in presence of a subscribing witness.

ADOLPHE CHALAS.

Witness:
 MARCEL COMPIN.